D. E. LEWELLEN.
FRAME CONSTRUCTION.
APPLICATION FILED MAR. 18, 1920.
1,386,939. Patented Aug. 9, 1921.
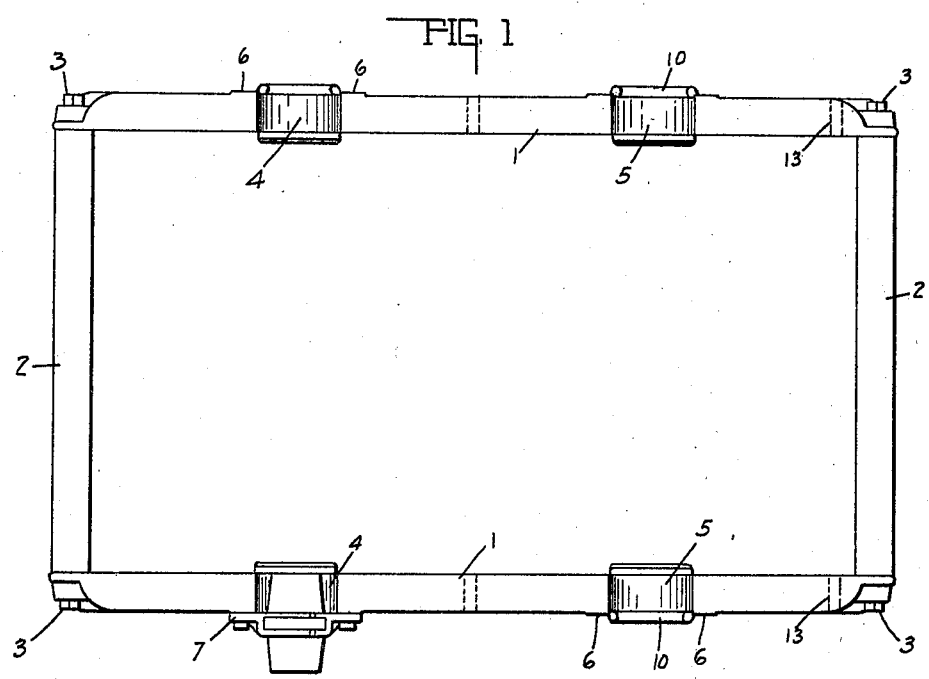
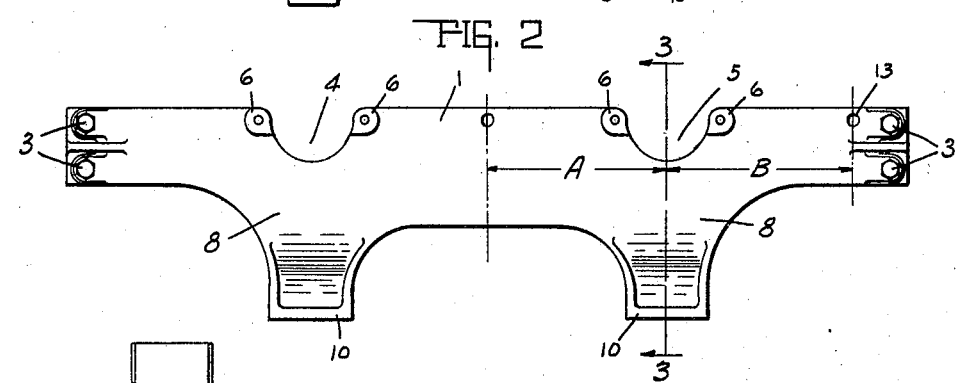
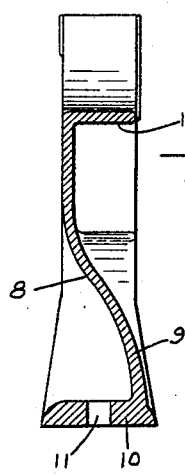
INVENTOR.
Darcy E. Lewellen
ATTORNEYS.

UNITED STATES PATENT OFFICE.

DARCY E. LEWELLEN, OF COLUMBUS, INDIANA, ASSIGNOR TO LEWELLEN MANUFACTURING COMPANY, OF COLUMBUS, INDIANA, A CORPORATION OF INDIANA.

FRAME CONSTRUCTION.

1,386,939.      Specification of Letters Patent.      Patented Aug. 9, 1921.

Application filed March 18, 1920. Serial No. 366,749.

*To all whom it may concern:*

Be it known that I, DARCY E. LEWELLEN, a citizen of the United States, residing at Columbus, in the county of Bartholomew and State of Indiana, have invented certain new and useful Improvements in Frame Construction, of which the following is a specification.

This invention relates to frames, more particularly to a frame adapted to house variable speed transmission mechanisms of the type shown and described in my copending application, Serial No. 336,747, filed March 18, 1920, for variable speed transmission. Hitherto, such frames were made in two parts, and in order to cast the same it was necessary to use deep flasks and many cores, making it difficult to withdraw the pattern from the sand, and to produce sound castings. My present invention obviates these difficulties, it being among the objects thereof to produce a frame which does not require deep flasks nor many cores, is cheap to manufacture, and easy to assemble.

In carrying the objects of my invention into effect, I provide a frame consisting of side and end members which are preferably bolted together. I further provide a peculiar construction of the side members which allows the transmission mechanism to be more readily fitted thereto and removed therefrom for repair or replacement. Instead of forming holes for the bearings of the shafts which are placed therein, as was formerly done, I form depressions in the side members so that the shafts and bearings are simply dropped in place and secured therein.

Usually, to increase the strength of the side members, I provide extensions in line with the depressions, the extensions serving not only to strengthen the side members, but act as rests or feet for securing the frame to the floor, ceiling, or other suitable support. The feet are of such shape that no cores are necessary to cast the same. Further, I usually make the distance from the center of a bearing to the pivot of the operating lever, which is midway between the bearings, less than the distance from the bearing to the center of the shifting mechanism, and I am thereby enabled to use a shorter frame than was hitherto the case.

Referring to the accompanying drawings forming a part hereof, and in which similar reference characters denote similar parts, Figure 1, illustrates a plan view of my frame construction, Fig. 2, an elevation of one of the side members, and Fig. 3, a section on line 3—3 of Fig. 2.

The frame is composed of side members 1 and end members 2 secured together in any suitable manner, such as by bolts or screws 3; depressions 4 and 5 are formed in the side members and have machined surfaces 6 for the reception of plates 7 carrying bearings, and which are bolted to the frame on the machined boss portions 6.

The side members 1 are provided with extensions 8 in line with and directly below depressions 4 and 5, the extensions being curved, as shown at 9, and terminating in flat bottom portions 10 constituting the feet upon which the mechanism is supported. Holes 11 are either cored or drilled in the bottom portion to serve as means for securing the frame to the support. A rib 12 extending usually around the entire periphery of the side members is provided for strengthening purposes.

The shifting mechanism is secured in openings 13 placed near one end of the frame. I generally space the center-lines of depressions 4 and 5, and openings 13 so that the distance between depressions 5 and opening 13, denoted as B, is substantially greater than the distance A, which is one-half the distance between the center-lines of depressions 4 and 5. By so proportioning the said member I am enabled to use a shorter side member than would be possible otherwise. The reason for this is as follows: Shafts are secured in depressions 4 and 5 which carry cone-shaped disk members between which is secured a wedge-shaped belt, as fully disclosed in my application above referred to. The top of the belt is provided with nuts or plates which project outwardly a short distance, thus generally rendering it necessary to lengthen the frame in order to prevent contact of the nuts with the shifting mechanism. I, therefore, shift the center-line of the shafts inwardly somewhat, so as to make distance B somewhat greater than A, and thus avoid lengthening the frame, or obtain a greater range of adjustability of speeds.

Having thus fully described my said invention, what I claim as new and desire to secure by Letters Patent, is:

1. A frame for variable speed transmission mechanism comprising a pair of side members and a pair of end members, bolts for securing said members together at their ends and forming a substantially rectangular shaped frame, depressions in the upper edges of said side members for the reception of shafts, and extensions integral with and extending downwardly from the lower edges of said side members and forming supports for the frame.

2. A frame for variable speed transmission mechanism comprising side members and end members, said members being secured together, depressions in said side members for the reception of shafts, and extensions in line with said depressions providing feet for securing said frame to a suitable support, said feet comprising curved body portions formed integrally with flat bottom portions.

3. A frame for variable speed transmission mechanism comprising side and end members, said side members having alining openings therethrough near one end thereof for the reception of a shifting mechanism, said members being secured together and a pair of depressions in each side member for the reception of shafts spaced a uniform distance at opposite sides of the longitudinal center of the side member, the length of the space between the openings for the shifting mechanism and the depressions nearest thereto being greater than the length of the space between the same depressions and a point at the longitudinal center of the side members.

4. A frame for variable speed transmission mechanism comprising a pair of side and end members, each side member having an opening therethrough near one end thereof, the opening in one side member being in alinement with the opening of the other side member and adapted to receive a shifting mechanism, and a pair of depressions in each side member for the reception of shafts, the pair of depressions in one side member alining with the pair of depressions of the other side member, the distance from the opening for the shifting mechanism through one side member to the center of the nearest depression in the same side member being greater than the distance from the center of the same depression to a point centrally between it and the other depression in the same side member.

In witness whereof, I have hereunto set my hand and seal at Indianapolis, Indiana this 11th day of March, A. D. nineteen hundred and twenty.

DARCY E. LEWELLEN. [L. s.]

Witnesses:
H. C. BIERMAN,
M. L. SHULER.